United States Patent [19]
Sato et al.

[11] 4,247,748
[45] Jan. 27, 1981

[54] METHOD FOR ELECTRICAL DISCHARGE MACHINING OF A WORK IN ROLL FORM

[75] Inventors: Kunihiko Sato, Owari-Asahi; Tetsuro Urata, Nagoya; Kobun Asakawa; Haruo Taguchi, both of Fukuyama; Yukio Kato, Kasugai; Takeo Uebayashi, Fukuyama, all of Japan

[73] Assignees: Mitsubishi Denki Kabushiki Kaisha; Nippon Kokan Kabushiki Kaisha, both of Tokyo, Japan

[21] Appl. No.: 954,643

[22] Filed: Oct. 25, 1978

[30] Foreign Application Priority Data

Oct. 29, 1977 [JP] Japan .................................. 52-129240

[51] Int. Cl.³ .................................................. B23 1/08
[52] U.S. Cl. ................................ 219/69 M; 219/69 V
[58] Field of Search .................... 219/69 R, 69 M, 69 V

[56] References Cited
U.S. PATENT DOCUMENTS 3,878,353  4/1975  Anderson .......................... 219/69 M

*Primary Examiner*—C. C. Shaw
*Attorney, Agent, or Firm*—Fleit & Jacobson

[57] ABSTRACT

There is disclosed a method for giving by electrical discharge machining a uniform satin finish to the roll surface of a work in roll form in a short period of time. To prevent the occurrence of any streaky pattern on the satin finish work surface, a plurality of divided electrodes, which are divided and arranged at predetermined spaces, are each fed traversely a distance corresponding to the electrode mounting pitch while maintaining the predetermined spacing between the electrodes. To improve the working efficiency, a plurality of rows of divided electrodes are provided, and by virtue of this improved working efficiency, the required satinizing electrical discharge machining of two or four rolls for use on a rolling mill can be completed within the life time of the satinized rolls being used on the rolling mill.

2 Claims, 8 Drawing Figures

PRIOR ART FIG. 1
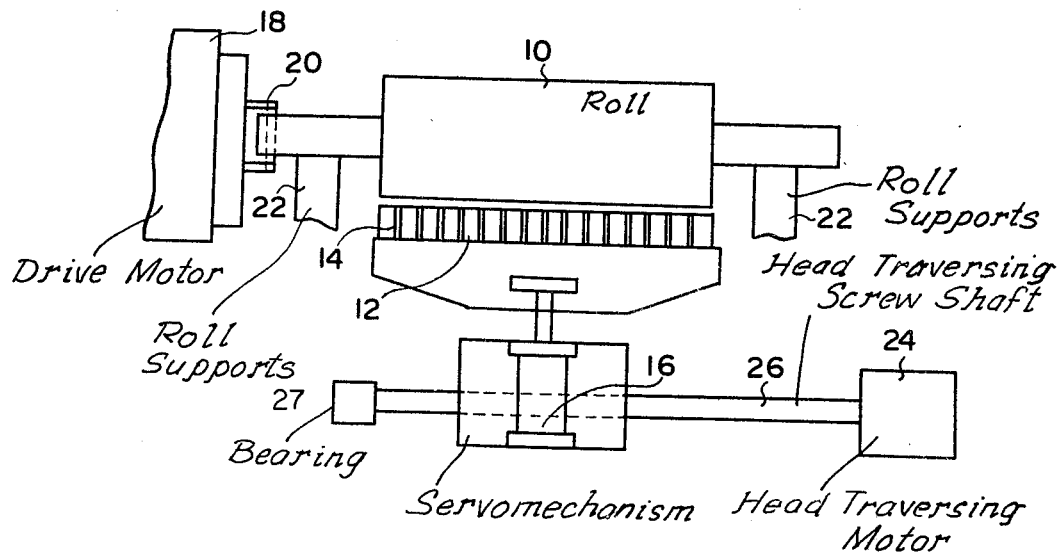
PRIOR ART FIG. 2
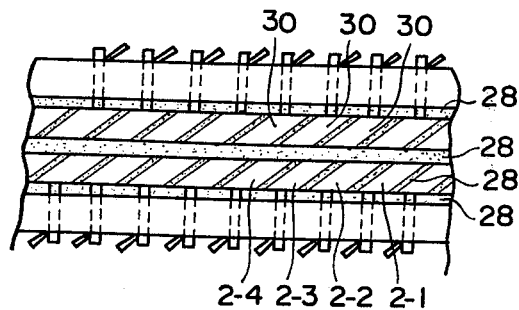

METHOD FOR ELECTRICAL DISCHARGE MACHINING OF A WORK IN ROLL FORM

BACKGROUND OF THE INVENTION

The present invention relates to methods for electrical discharge machining of works in roll form, and more particularly the invention relates to an electrical discharge machining method for giving a satin finish to the outer surface of a work in roll form with a predetermined uniform roughness and a high efficiency.

Generally, the life of satinized rolls used on rolling mills is such that the satinized rolls can be used effectively only for one or two hours due to wear of the satinized roll surface, although this life time differs somewhat depending on the thickness, width, mechanical properties and rolling reduction or draft of material to be rolled, rolling mill performance, etc. As a result, there has existed a need for an electrical discharge machine which is capable of satinizing a set of rolls (two or four rolls) on a rolling mill at least in a period of 1 to 2 hours. It is also preferable that a single electrical discharge machine be capable of giving a satin finish to the rolls used on two or more rolling mills and its machining capacity must be increased further for this purpose.

In the past, a method of giving a satin finish to the surface of rolls by an electrical discharge machine has been proposed in which method, as shown in FIG. 1, an electrode group 12 having substantially the same total length as a roll 10 supported on roll supports 22 is arranged opposite to the roll 10, the roll 10 is rotated from a drive motor 18 through a drive transmission mechanism 20 while at the same time the electrode group 12 is moved at intervals by rotating a head traversing screw shaft 26 from a head traversing motor 24, and a desired working gap is maintained by a servomechanism 16, thus effecting the electrical discharge machining.

With this method, the electrode group 12 is composed of a large number of insulated and divided electrodes which are arranged substantially to the same extent as the roll 10 along the axis thereof, and each of the plurality of electrodes (see FIG. 2) 30 which are insulated and divided by insulators 28 has a cross-sectional shape constituting a parallelogram as shown by the cross-sectional view of FIG. 2. In this case, as is well known, discharge between the roll and the electrode tends to jump to the electrode end portions having a reduced sectional area in view of the discharge efficiency, and this tends to impede the formation of a uniform satin finish over the entire roll surface. As a result, the electrode group 12 is moved along the roll axis a predetermined distance which is less than the length of one electrode piece from time to time. However, the uniformity of satin finish on rolling mill rolls must be such that a streaky pattern even of a very small degree that cannot be seen by visual inspection, has a detrimental effect, making it unfit for use as a rolling mill roll, and while the pass-fail test is effected by chalk test or the like, in practice it is not an easy matter to determine the proper timing for moving the electrode group 12 from time to time so as to ensure the uniform satin finish at all times. Moreover, due to the fact that the electrode group 12 of substantially the same length as the roll body length is moved along the roll axis, on each end the electrode piece is deviated from the roll, and consequently the deviated electrode piece does not cause discharge, thus changing the electrode shape having substantially the same shape as the desired contour of the finished roll. In this case, if the electrode changed in shape is moved in the opposite direction, until the disfigured portion of the electrode piece is consumed so as to conform with the other portions having the proper shape, the other portions or the greater portion of the electrode piece fails to produce discharge. This has the effect of greatly deteriorating the electrical discharge machining capacity.

There is another method known in the art in which, as shown in FIG. 3, the forward end of an undivided single electrode 12' is partially conformed with the shape of the outer curved surface of a roll 10 and the electrode 12' is fed at a constant speed in the lengthwise direction of the roll 10. The electrode material is changed to make the electrode consumable, and in this way the electrical discharge machining is effected. However, due to the use of the single electrode 12', the machining capacity is not sufficient for the machining of works such as rolling mill rolls having a large work surface area and requiring a high degree of efficiency, and therefore this method has not been put in practical use as yet.

SUMMARY OF THE INVENTION

It is an object of the present invention to provide an electrical discharge machining method which ensures a machining efficiency whereby the satinizing electrical discharge machining of rolls required by a rolling mill can be completed within the life time of the satinized rolls being used on the rolling mill.

It is another object of the present invention to provide a electrical discharge machining method employing an electrode arrangement and electrode traversing which ensure the completion of the desired electrical discharge machining of rolls in a short period of time and the machining of the roll surfaces with a predetermined uniform roughness.

Other and further objects, features and advantages of the invention will appear more fully from the following description.

BRIEF DESCRIPTION OF THE DRAWINGS

FIG. 1 is a schematic diagram for explaining a prior art satinizing electrical discharge machining method.

FIG. 2 is a cross-sectional view of the electrode group used with the prior art method of FIG. 1.

DESCRIPTION OF THE PREFERRED EMBODIMENTS

Figure 3:
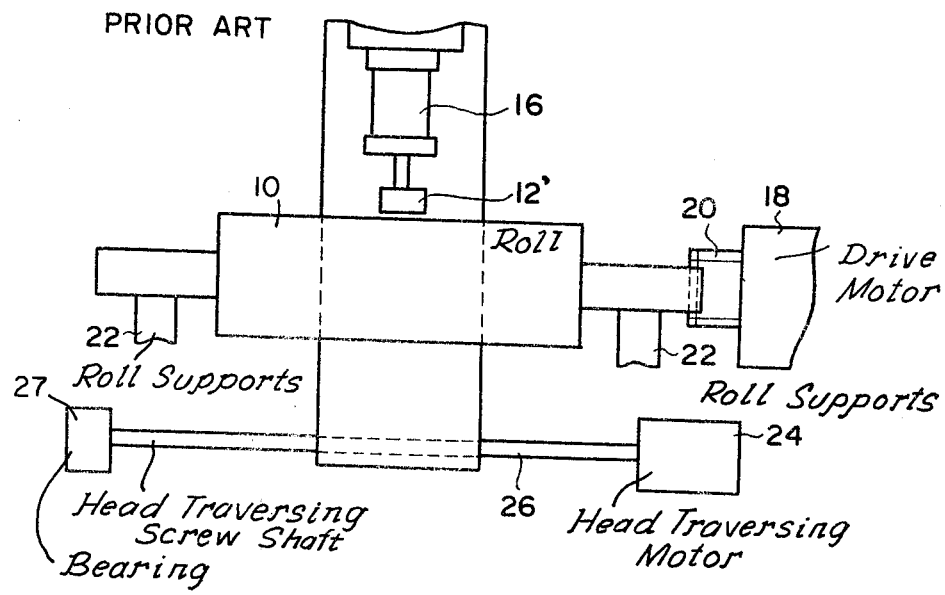
FIG. 3 is a schematic diagram for explaining another prior art satinizing electrical discharge machining method.
Figure 4:
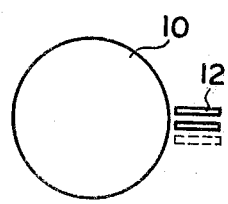
FIG. 4 is a side view showing an embodiment of the electrode arrangement used with an electrical discharge machining method according to the invention.
Figure 5:
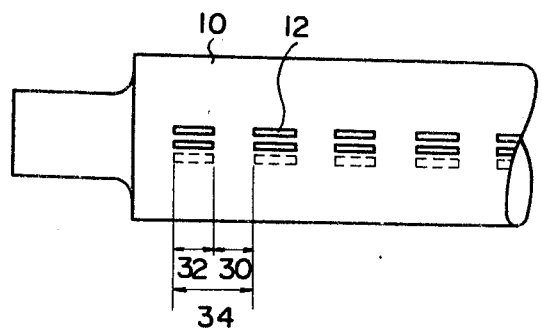
FIG. 5 is a front view of FIG. 4 looked from the electrode side.

Referring to FIGS. 4 and 5 showing one form of the electrode arrangement used with the electrical discharge machining method according to the invention, a plurality of rows of multi-divided rectangular electrodes, three rows in the illustrated embodiment, are arranged along the axis of a roll 10, and the electrodes in each row are arranged along the roll axis at a predetermined spacing 30. In this case, the width of each electrode is indicated at 32 and consequently the mounting pitch of the electrodes in each row becomes as indicated at 34.

With this electrode arrangement, in accordance with the electrical discharge machining method of this invention, the roll 10 is rotated at a constant speed and the electrodes 12 are always moved traversely along the roll axis a distance equal to the electrode mounting pitch 34 while maintaining the relative positions of the electrodes, thus causing discharges across the working gap defined by the electrodes 12 and the roll 10 and thereby efficiently satinizing the outer surface of the roll 10.

Figure 6:
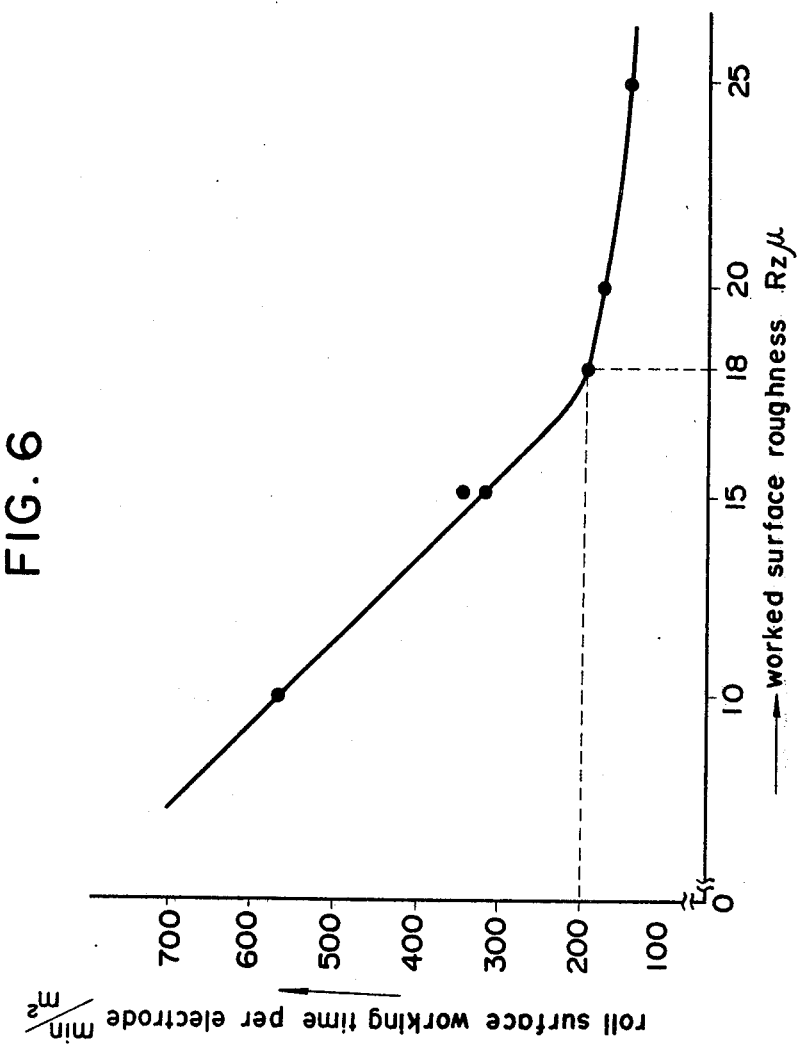
FIG. 6 is a graph showing the relationship between the worked surface roughness Rz and the roll surface working time per electrode during satinizing electrical discharge machining.

The electrical discharge machining method of the invention will now be described in greater detail with reference to the actual examples. Referring to FIG. 6, there is illustrated a graph showing the relationship between the working efficiency or worked surface roughness (Rz) per electrode and the roll surface working time (min/m$^2$) per electrode; assume that the electrical discharge machining is effected under the following conditions:

Roll diameter (D): 560 mm$\phi$
Roll body length (L): 1950 mm
Number of heads: 5
Number of divided electrodes: 80
Number of rows of electrodes: 4
Electrode size: 1 mm (thick)×50 mm (wide)
Satinized roll surface roughness (Rz): 18 $\mu$ Since the working time per electrode (Ha) for the required surface roughness $Rz=18\mu$ is given as 200 min/m$^2$ from FIG. 6 and the satinizing work surface area (S) of the roll itself is given by $S=\pi DL$ or 3.42 m$^2$, assuming 100% divided efficiency, the apparent working time per roll will be given by (200 min/m$^2$ ×3.42 m$^2$/roll)/ 80 divisions =8.55 min/roll The results of the experiments have shown that the divided efficiency does not decrease with an increase in the number of heads but decreases with an increase in the number of divided electrodes per head and that, as compared with the four divisions per head (See FIG. 7), the divided efficiency will become about 0.8 according to 80 divisions/5 heads=16 divisions under the previously mentioned conditions.

Thus, the practical working time is given by
8.55 min/roll/0.8 ≈ 11 min/roll
This represents a practical working efficiency.

Consider this working efficiency (min/roll) with reference to an electrode arrangement in which the electrodes are arranged in a single row with the minimized electrode spacing. With the roll body length of 1950 mm, if the insulating spacing of the divided electrodes becomes 35 and thus the working efficiency is similarly given by (200 min/m$^2$×3.42 m$^2$/roll)/35 divisions=20 min/roll Assuming now that a set of two rolls is used on a rolling mill, then the working efficiency is given by
20 min/roll×2 +$\alpha$ In other words, 40 minutes per stand plus the time $\alpha$ required for removing and setting rolls on an electrical discharge machine are necessary. While this required time $\alpha$ differs as a matter of course depending on the type of roll changing method used, if the ordinary overhead travelling crane is used, the average practical value will be on the order of $\alpha=10$ (min/roll). As a result, the overall working efficiency will be 60 min/set. This value corresponds to the worked surface roughness $Rz=18\mu$, and the minimum surface roughness required for rolls used on rolling mills is on the order of $Rz=10\mu$. However, as will be seen from the graph of FIG. 6, the working time increases in inverse proportion to an increase in the fineness of worked surface roughness, thus making the working capacity insufficient in view of the frequency of use of the rolling mill, and thereby making its practical use difficult. It may be said that this fact proves great utility of the electrical discharge machining method of this invention employing a plurality of rows of divided electrodes to ensure an improved working efficiency.

Figure 7:
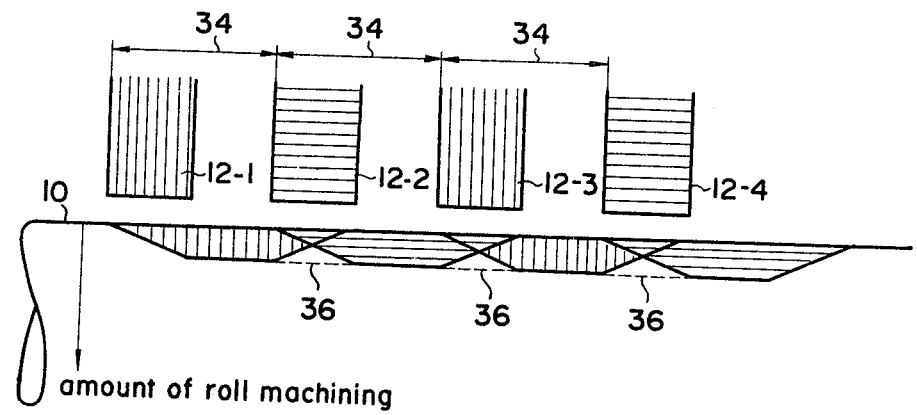
FIG. 7 is a diagram useful for explaining the amount of roll machining (the number of times of machining) with the amount of electrode movement of a distance equal to the electrode mounting pitch.
Figure 8:
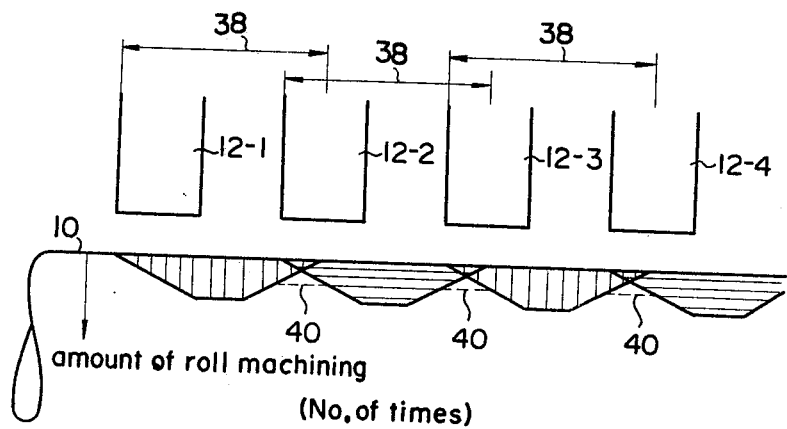
FIG. 8 is a diagram for explaining the amount of roll machining (the number of times of machining) obtained by using the amount of electrode movement which is greater than the electrode mounting pitch.

On the other hand, by moving each of electrodes 12-1, 12-2, 12-3 and 12-4 a distance of the electrode mounting pitch 34 along the roll axis at a constant speed, it is possible to produce a uniform worked surface 36 as shown by the dotted lines in FIG. 7. In other words, the number of times of machining by the electrodes is maintained constant and hence the amount of machining is made uniform at every position, thus preventing the occurrence of any abnormal streaky pattern in the roll surface. On the contrary, if the amount of electrode movement is selected greater or smaller then the electrode mounting pitch 34, an abnormal pattern will be caused by uneven machining. For example, if an allowance for movement 38 of the electrodes 12-1, 12-2, 12-3 and 12-4 is made greater than the electrode mounting pitch as shown in FIG. 8, the number of times of machining at the boundary portion between the adjoining electrodes differs from that of the other portions and the worked surface at the boundary portion projects beyond the other portions as shown at 40 in the Figure, thus making the satinized roll unifit for use as rolling mill roll. As a result, in order to produce a uniformly satinized roll surface, it is an absolutely essential requirement for the present invention to select the amount of movement for the electrodes to be a distance equal to the electrode mounting pitch.

It will thus be seen from the foregoing that, in accordance with the electrical discharge machining method of this invention, by virtue of the fact that the electrodes each have a rectangular discharge end surface, not only uniform discharge efficiency is ensured for each electrode but also uniformity is ensured for the entire satinized surface. Moreover, by virtue of the fact that the electrodes are arranged in a plurality of rows along the roll axis at a predetermined spacing, a working efficiency is ensured which suits the frequency of use of rolls on rolling mills, and also the fact that the allowance for movement of the electrodes is controlled at the electrode mounting pitch has the effect of ensuring the same number of times of machining over the entire roll surface and thereby further improving the uniformity of satinized roll surface.

While preferred forms and arrangements have been shown in illustrating the invention, it is to be clearly understood that various changes in detail and arrangement may be made without departing from the spirit and scope of this disclosure.

What is claimed is:

1. A method for electrical discharge machining of a work in roll form, said work in roll form having a roll axis and an axis of rotation, said method comprising the steps of:

providing a plurality of electrodes divided and arranged at a predetermined mounting pitch parallel to said roll axis of said work;

rotating said work in roll form at a constant speed;

simultaneously and continuously moving said plurality of electrodes at a predetermined constant speed along said axis of rotation of said work;

selecting the amount of movement for each of said plurality of electrodes to be a distance equal to said mounting pitch of said electrodes along said roll axis; and producing discharges across a working gap formed between said plurality of electrodes and an outer surface of said work to give a satin finish to the outer surface of said work;

wherein said providing step includes providing each of said plurality of electrodes with a rectangular discharge end surface, whereby to insure further uniform discharge efficiency.

2. A method according to claim 1, wherein said plurality of electrodes are arranged in a plurality of rows parallel to the roll axis of said work in roll form, each of said rows including a plurality of said electrodes divided and arranged at said predetermined mounting pitch, and wherein said plurality of rows of divided electrodes are moved at said predetermined constant speed along the axis of rotation of said work.